Jan. 23, 1940. H. K. HARTSUFF 2,188,095
CHUCK
Filed March 11, 1938 3 Sheets-Sheet 1
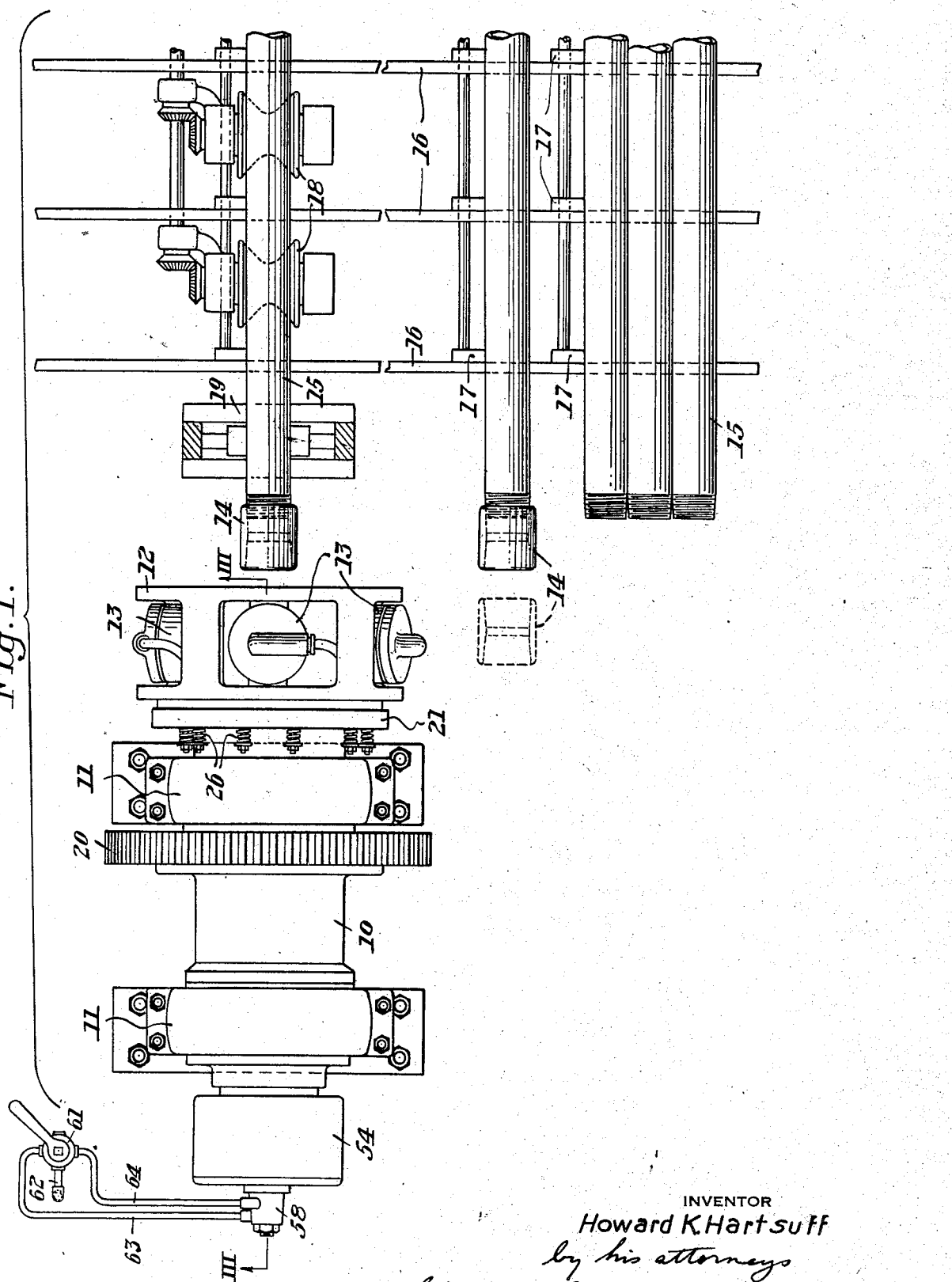
INVENTOR
Howard K. Hartsuff
by his attorneys
Stebbins, Blenko & Parmelee

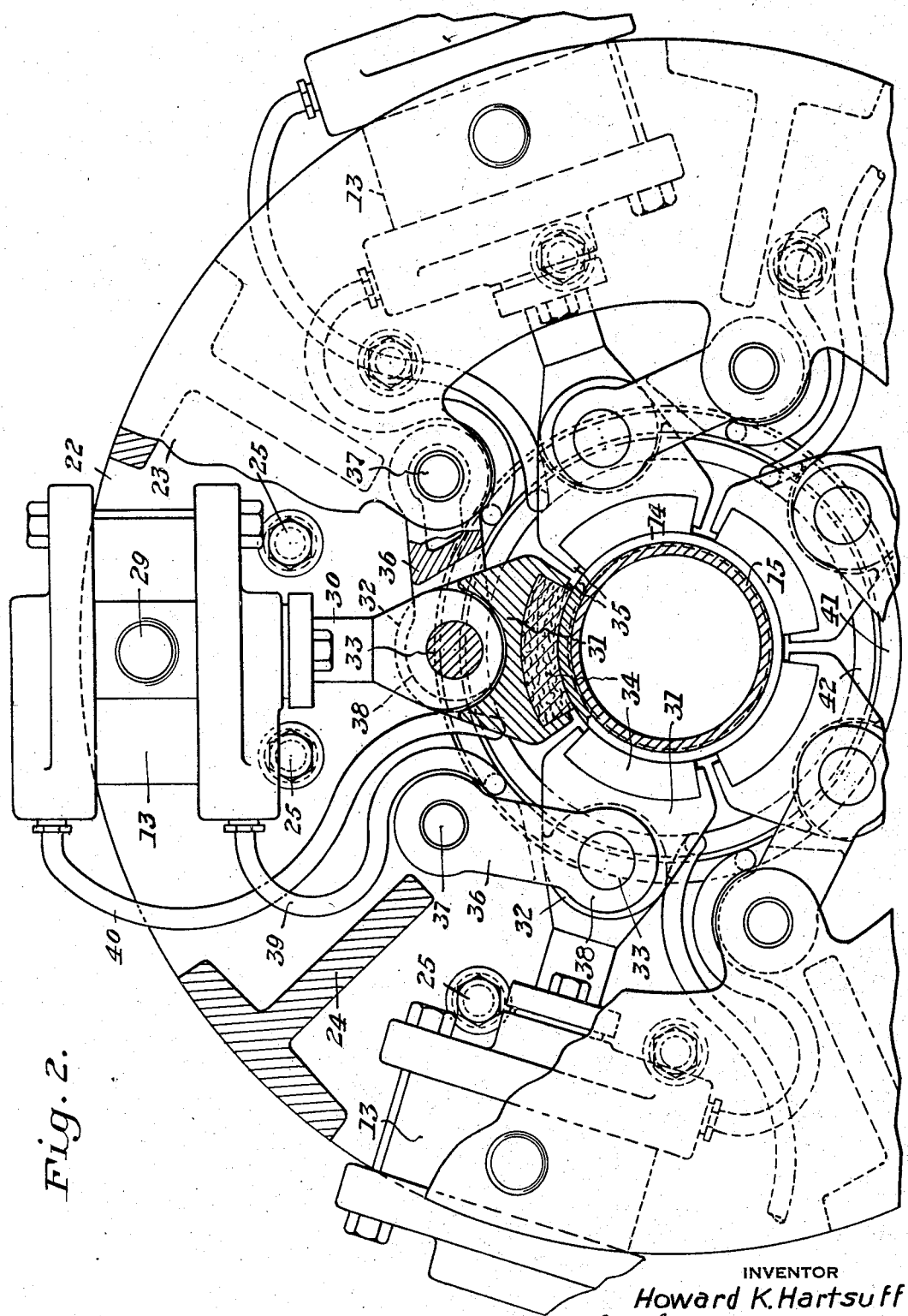

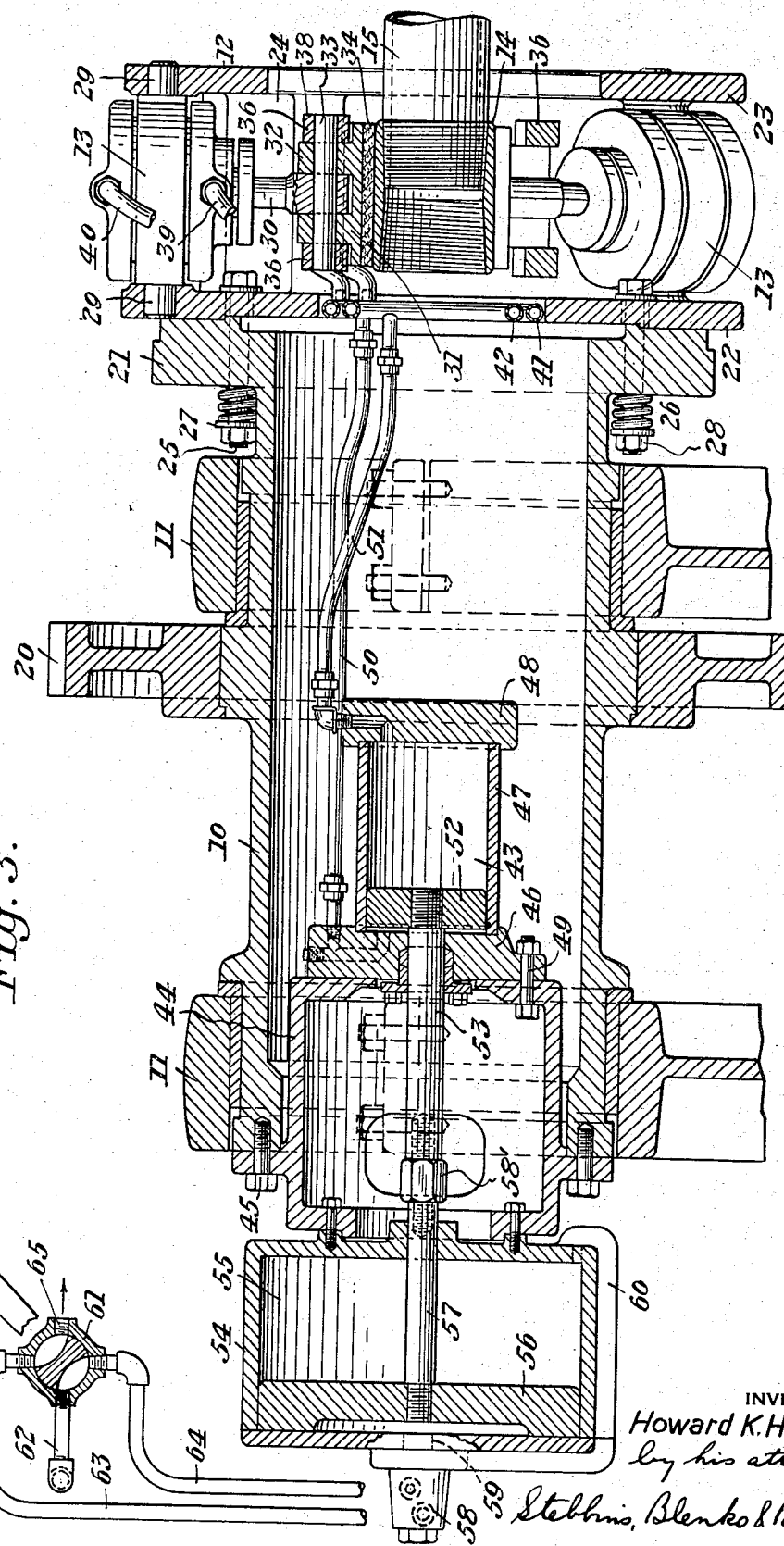

Patented Jan. 23, 1940

2,188,095

UNITED STATES PATENT OFFICE 2,188,095

CHUCK

Howard K. Hartsuff, Beaver, Pa., assignor to Jones & Laughlin Steel Corporation, a corporation of Pennsylvania Application March 11, 1938, Serial No. 195,295

5 Claims. (Cl. 279—4)

This invention relates to a chuck and, in particular, to a chuck for a coupling screw-on machine, although it may be adapted to other applications.

In the manufacture of certain classes of product such as line pipe, pipe lengths are threaded before shipment and are provided with a thread protector at one end and a coupling at the other. The coupling must be screwed home tight to form a leak-proof joint which will meet the A. P. I. tests. Under the present conditions of sale, the customer may test pipe at the manufacturer's plant, at any point en route, at the destination or in the field and may subject the pipe to a test of any duration at a predetermined pressure. If any leakage occurs in one length, the entire shipment may be rejected. These requirements make it essential that the coupling be properly screwed home on the pipe.

Coupling screw-on machines as heretofore made have been provided with mechanically actuated centering jaws having edged or serrated members adapted to grip the coupling and turn it onto the pipe. Couplings are usually made from short lengths of seamless tube, by boring and threading. It frequently happens, however, that the threaded bore of a coupling is not precisely co-axial with the exterior surface thereof.

It also happens frequently that the end of a pipe length will have a slight curve or "gooseneck." Thus, when it is attempted to screw on couplings with the aid of apparatus having mechanically actuated gripping members, the pressure exerted by the latter may vary considerably around the circumference of the coupling and the latter may be perceptibly distorted from its cylindrical shape. Couplings for well casing are particularly subject to this distortion, as they have a relatively thin wall to limit the maximum outside diameter of the casing.

The edged or serrated gripping surfaces of the chucks used in the past have been found to mark the couplings objectionably but a more serious matter is the galling of the threads as the coupling is screwed on, which results from the distortion of the coupling by the non-uniform pressures exerted at various points therearound. Couplings are usually electro-galvanized to facilitate screwing on but the non-uniform pressures exerted by the mechanically actuated chuck jaws have caused the galvanized coating to be rubbed off, and the galling of the threads resulting has prevented the coupling from being screwed on to the full extent of the threaded portion at the end of the pipe length. This causes rejection of the length because a leak-proof joint can be made only by screwing the coupling on to the full extent of the threads on the pipe.

The chucks previously employed in coupling screw-on machines, furthermore, have teeth or serrations sloped toward the screwing-on direction and are incapable of applying torque to the couplings in the other direction. This prevents them from being used to unscrew a coupling in case of galling of the threads, to permit rethreading. The chuck jaws, furthermore, being rigidly mounted, tend to center the exterior surface of the coupling with the axis of the machine, regardless of curvature in the axis of the pipe adjacent the end, or lack of coincidence between the axes of the coupling bore and the exterior surface thereof, so that the pressure exerted by the chuck jaws varies from point to point as rotation of the chuck proceeds. This distorts the coupling and causes the galling referred to above.

I have invented a novel form of chuck which overcomes the aforementioned objections and is characterized by additional features of novelty and advantage which will be explained more fully herebelow and particularly pointed out in the appended claims. In a preferred form, my invention comprises a barrel mounted for rotation having a head tiltably supported at one end thereof. Radial hydraulic cylinders are spaced circumferentially about the head and have pistons and piston rods reciprocable therein. Jaws pivoted to the piston rods are adapted to engage the coupling and are provided with resilient frictional inserts whereby the necessary torque may be applied to thread the coupling onto the end of a pipe length. I provide means for driving the barrel to cause rotation of the chuck jaws. The barrel also carries the hydraulic system for actuating the pistons and the rods on which the jaws are pivoted. The following detailed description refers to the accompanying drawings illustrating a preferred embodiment. In the drawings:

Fig. 1 is a plan view largely diagrammatic, showing the chuck of my invention in relation to the other apparatus in connection with which it is installed;

Fig. 2 is an end view of the chuck such as would be seen by looking from the right in Fig. 1 with parts broken away and parts in section;

Fig. 3 is a sectional view taken along the line III—III of Fig. 1; and

Fig. 3—A is a diagram of the control system for the operating fluid.

Referring now in detail to the drawings, and for the present to Fig. 1, the chuck of my invention comprises a barrel 10 mounted for rotation in suitable bearings 11 and carrying a head 12 at one end thereof. Hydraulic cylinders 13 spaced circumferentially of the head have jaws adapted to engage a coupling 14 on a pipe length 15.

As shown diagrammatically in Fig. 1, pipe lengths such as 15 are fed along skids 16 from the threading machine. At an intermediate position, couplings 14 are started on the ends of the pipe lengths by hand. Stops 17 hold the pipe lengths at appropriate points to permit a coupling to be started on each length. When a coupling has been started on a length, it is advanced down the skids 16 to a position above conveyor rolls 18 and deposited thereon, as by lowering the skids 16 or the portion thereof immediately adjacent the rolls 18. When a pipe length has been deposited on the rolls 18, it is moved axially toward the head 12 until the coupling 14 is in alinement with the jaws actuated by the cylinders 13. A wrench indicated diagrammatically at 19 is then operated to grip the pipe length and hold it against rotation while the coupling is being screwed home. The wrench may be of any suitable type but the details thereof are not part of the present invention so require no further mention.

The details of the chuck may best be observed in Figures 2 and 3. The barrel 10 is provided with a driving gear 20 adapted to mesh with any suitable form of gear drive (not shown). A flange 21 extends outwardly from the right hand end of the barrel providing a seat for the head 12. The latter comprises axially spaced annular portions 22 and 23 or discs connected by ribs 24. The head is secured to the barrel by bolts 25 extending through holes in the flange 21 and annular portion 22 of the head 12. Springs 26 are disposed about the bolts 25 between the flange 21 and washers 27 bearing against the nuts threaded on the bolts, shown at 28. The springs 26 constitute yieldable means for holding the head 12 against the flange 21. The head may, however, be tilted from its normal position if the forces tending to cause such movement are sufficient to overcome the forces exerted by the springs 26. In any event, the bolts 25 transmit torque from the barrel 10 to the head 12. Co-operating shoulders on the flange 21 and portion 22 prevent radial shifting of the head on the barrel.

The cylinders 13 are spaced circumferentially of the head 12 as shown in Fig. 2 and have trunnions 29 extending into the annular portions 22 and 23 of the head, whereby the cylinders are swingably mounted thereon. The cylinders 13 have pistons reciprocable therein and piston rods 30 actuated thereby. The jaws previously mentioned as being pivoted to the piston rods are shown at 31 and have lugs 32 at points spaced therealong adapted to receive pins 33, each of which traverses a bore in the end of one of the piston rods. Each jaw is provided with an insert 34 composed of resilient frictional material such as employed for brake bands. The sides of the jaws extend inwardly around the inserts as at 35 to form shrouds for the latter. The inserts may easily be removed and replaced, and different sets of inserts may be provided for different sizes of pipe.

Links 36 are pivoted on pins 37 extending between the annular portions 22 and 23 of the head. The links 36 are of yoke shape and have ends 38 bored to receive the pins 33. The function of the links is to prevent tilting of the jaws in longitudinal, radial planes from affecting the piston rods 30 and to cause any such tilting force to be transmitted directly to the head 12, tilting whereof is permitted by the springs 26 as previously explained.

Fluid under pressure is supplied to opposite ends of the cylinders 13 through flexible connections 39 and 40 extending from manifolds 41 and 42. The manifolds may be carried on the head 12 in any convenient manner, preferably at the side thereof adjacent the flange 21 as indicated in Fig. 3. A pump 43 of the cylinder and piston type, is disposed coaxially within the barrel 10. A cylindrical adapter 44 is secured to the end of the barrel opposite that on which the head 12 is carried by screws 45. The pump 43 comprises a head 46, a body 47, and a head 48. The head 46 is secured to the adapter 44 by bolts 49. Passages formed in the heads 46 and 48 are connected to the manifolds 41 and 42 by conduits 50 and 51. The pump 43 has a piston 52 mounted on a piston rod 53 extending axially through the adapter 44.

A pneumatic motor for actuating the piston 52 is indicated generally at 54 and comprises a cylinder 55 having a piston 56 reciprocable therein and a rod 57 secured to the piston and coupled to the rod 53 by a coupling 58'. A rotary compressed air connection 58 communicates with passages leading to opposite ends of the cylinder 55, the passages being indicated at 59 and 60. A valve 61 permits air pressure to be delivered from any convenient source indicated at 62 to either end of the cylinder 55 through connections 63 and 64, the opposite end of the cylinder being vented to atmosphere at 65. It will be apparent that movement of the piston 56 from the position illustrated in Fig. 3 to the opposite end of the cylinder 55 will cause similar movement of the piston 52 of pump 43 and result in advancement of the piston rods 30 and the jaws 31 carried thereby. Retraction of the pistons 56 and 52 causes the opposite effect.

When a pipe length 15 having a coupling 14 started thereon as shown in Fig. 1 is positioned so that the coupling is within the jaws 31, the valve 61 is operated to cause actuation of the jaws. Pipe lengths are frequently bent slightly adjacent their ends and as a result, the coupling may not be disposed precisely coaxial with the barrel 10 and the head 12 when engaged by the jaws. This result may also follow from the lack of concentricity between the bore through the coupling and the periphery thereof. In any event, no substantial pressure is applied to any one of the jaws until they have engaged the coupling. Until this result occurs, the pressure in the hydraulic system cannot exceed that necessary to cause advancement of those jaws which have not yet engaged the coupling. Each of the several jaws exerts the same pressure on the coupling since the cylinders are connected to a common hydraulic system, and pressure applied to an enclosed fluid is transmitted equally in all directions. The coupling thus serves to position the jaws even though the coupling is not coaxial with the coupling or barrel. If the coupling is at a considerable angle to the axis of the barrel, the links 36 cause the entire head 12 to be tilted as may be required by the angular disposition of the coupling, without imposing any lateral force on the piston rods 30.

When the barrel is driven through the gear 20, the jaws move radially as required by the angular relation of the coupling to the axis of the chuck, as the pressure in each cylinder 13 is the same. The chuck jaws thus float in positions determined by the initial position of the coupling. Since the pressure applied to the coupling connecting the periphery is substantially uniform, there can be no distortion thereof even though the couplings have a thin wall. This avoids galling of the threads on the end of the pipe. Since the turning effort on the coupling depends only on the coefficient of friction between the latter and the inserts 34, the coupling may be unscrewed as well as screwed on in case that should be desirable. It will be understood that in case the head 12 is tilted by the angular position of the coupling, the head will oscillate as the barrel turns, first one side of the head being tilted away from the barrel and then the other. Because of the resilient character of the material of which the inserts 34 are composed, marking of the couplings is entirely eliminated.

Among other advantages of the invention may be mentioned its simplicity. The entire hydraulic system is self contained and rotates with the barrel, eliminating any necessity for running connections. Air is supplied to the pneumatic motor 54 by sliding connections which can be made sufficiently air-tight for the purpose. Slight leakage of air from such connection, however, is not seriously objectionable. All joints in the hydraulic system may be made leak tight, thus avoiding the waste and hazard of leaking oil, as well as the necessity of its removal.

The fact that the jaws engage practically the entire periphery of the couplings further prevents distortion of the latter. The pivotal mounting of the cylinders permits them to shift slightly if necessary to permit the jaws to engage the coupling evenly. The entire construction is simple and readily accessible for inspection or repair.

Although I have illustrated and described herein but a preferred embodiment of the invention, it will be understood that changes in the construction and arrangement disclosed may be made without departing from the spirit of the invention or the scope of the appended claims.

I claim:
1. A chuck comprising a barrel, an annular head mounted thereon, a plurality of hydraulic motors spaced circumferentially of said head and radially disposed thereon, a jaw pivoted to each motor, means yieldingly holding said head against said barrel, thereby permitting tilting of the head, and links pivoted to said head and to said jaws on axes parallel to that of the head, the dimension of said links axially of said head being such as to cause tilting of the head on tilting of said jaws.

2. A chuck comprising a barrel, a head mounted on the end of said barrel, means yielding holding said head on the end of said barrel thereby permitting tilting of the head, a plurality of jaws spaced circumferentially of said head, means for advancing and retracting said jaws, and yoke members pivoted to said head on an axis parallel to that of the head, the ends of said members being pivoted to said jaws at points spaced axially therealong, said members being long enough to cause tilting of the head on tilting of the jaws.

3. A chuck comprising a rotatable barrel, a head carried thereby including spaced annular portions, a plurality of cylinders on said head disposed radially of the axis of the barrel and trunnioned between said portions, pistons and piston rods reciprocable in said cylinders, chuck jaws carried by said piston rods, and means guiding the reciprocating movement of said jaws.

4. A chuck comprising a rotary support including a radial flange, a head carried by said support, fluid-pressure cylinders trunnioned radially in said head and spaced circumferentially thereof, means yieldingly holding said head to said support so as to permit tilting of the head relative to the support, jaws actuated by said cylinders, and means connecting said jaws to said head whereby tilting of the jaws causes tilting of the head.

5. A chuck as defined by claim 4 and characterized by said support comprising a barrel and said head a pair of spaced discs, and flexible conduits extending to said cylinders through said barrel.

HOWARD K. HARTSUFF.